US012607831B2

(12) United States Patent
Lim et al.

(10) Patent No.: US 12,607,831 B2
(45) Date of Patent: Apr. 21, 2026

(54) FOLDED LENS SYSTEM

(71) Applicant: SAMSUNG ELECTRO-MECHANICS CO., LTD., Suwon-si (KR)

(72) Inventors: Tae Yeon Lim, Suwon-si (KR); Yong Joo Jo, Suwon-si (KR); Jae Hyuk Huh, Suwon-si (KR); Do Hyeong Jang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 530 days.

(21) Appl. No.: 18/093,052

(22) Filed: Jan. 4, 2023

(65) Prior Publication Data

US 2023/0314775 A1      Oct. 5, 2023

(30) Foreign Application Priority Data

Apr. 5, 2022    (KR) ......................... 10-2022-0042397

(51) Int. Cl.
*G02B 13/00*          (2006.01)
*H04N 23/55*          (2023.01)
(52) U.S. Cl.
CPC ..... *G02B 13/0065* (2013.01); *G02B 13/0045* (2013.01); *H04N 23/55* (2023.01)
(58) Field of Classification Search
CPC ......................... G02B 13/0065; G02B 13/0045
See application file for complete search history.

(56) References Cited

U.S. PATENT DOCUMENTS

| | | | |
|---|---|---|---|
| 6,259,564 B1 | 7/2001 | Kamo | |
| 10,429,150 B1 | 10/2019 | Thomas et al. | |
| 2006/0279857 A1* | 12/2006 | Levola | G02B 15/00 |
| | | | 359/642 |
| 2007/0126911 A1 | 6/2007 | Nanjo | |
| 2015/0172551 A1 | 6/2015 | Irie | |
| 2017/0038553 A1 | 2/2017 | Fukino | |
| 2017/0139184 A1 | 5/2017 | Bae | |
| 2018/0267271 A1* | 9/2018 | Tseng | H04M 1/0264 |
| 2019/0183335 A1 | 6/2019 | Yu et al. | |
| 2019/0196148 A1 | 6/2019 | Yao et al. | |

(Continued)

FOREIGN PATENT DOCUMENTS

| | | |
|---|---|---|
| JP | 2000-155357 A | 6/2000 |
| JP | 2020-530915 A | 10/2020 |

(Continued)

OTHER PUBLICATIONS

Korean Office Action issued on Jul. 10, 2024, in counterpart Korean Patent Application No. 10-2022-0042397 (6 pages in English, 5 pages in Korean).

(Continued)

*Primary Examiner* — Alexander P Gross
(74) *Attorney, Agent, or Firm* — NSIP Law

(57) ABSTRACT

A folded lens system includes a lens module including a plurality of lenses, an image sensor having an imaging plane, and a first reflection module disposed between the lens module and the image sensor and configured to change a path of light passing through the lens module a plurality of times. The light passing through the lens module is subjected to three total internal reflections and two reflections by the first reflection module.

14 Claims, 4 Drawing Sheets

(56) References Cited

U.S. PATENT DOCUMENTS

| | | | |
|---|---|---|---|
| 2021/0063702 A1 | 3/2021 | Kim et al. | |
| 2021/0080706 A1 | 3/2021 | Lin et al. | |
| 2021/0199936 A1 | 7/2021 | Dai et al. | |
| 2021/0294074 A1 | 9/2021 | Yao et al. | |
| 2022/0091395 A1* | 3/2022 | Huang | G03B 5/00 |
| 2022/0357567 A1* | 11/2022 | Zhao | G03B 30/00 |

FOREIGN PATENT DOCUMENTS

| | | |
|---|---|---|
| JP | 2021-507292 A | 2/2021 |
| TW | 200736657 A | 10/2007 |
| TW | 201140133 A1 | 11/2011 |
| TW | 202204967 A | 2/2022 |
| WO | WO 2019/036498 A1 | 2/2019 |

OTHER PUBLICATIONS

Korean Office Action issued on Mar. 26, 2025, in corresponding Korean Patent Application No. 10-2022-0042397 (8 pages in English, 6 pages in Korean).

Taiwanese Office Action issued on Aug. 15, 2023, in counterpart Taiwanese Patent Application No. 112100842 (4 pages in English, 4 pages in Chinese).

Taiwanese Office Action issued on Oct. 14, 2024, in corresponding Taiwanese Patent Application No. 113134346. (3 pages in English, 4 pages in Taiwanese).

Taiwanese Office Action issued on Oct. 13, 2025, in counterpart Taiwanese Patent Application No. 114134721 (6 pages in English, 5 pages in Chinese).

Chinese Office Action issued on Mar. 19, 2026, in counterpart Chinese Patent Application No. 202310093422.7. (4 pages in English, 6 pages in Chinese).

* cited by examiner 300     110 120 130 140 150     400     500 600

100

500

410   430

400

300    100

FOLDED LENS SYSTEM

CROSS-REFERENCE TO RELATED APPLICATIONS

This application claims the benefit under 35 USC 119(a) of Korean Patent Application No. 10-2022-0042397 filed on Apr. 5, 2022, in the Korean Intellectual Property Office, the entire disclosure of which is incorporated herein by reference for all purposes.

BACKGROUND

1. Field

The present disclosure relates to a folded lens system.

2. Description of the Background

A camera module may be basically employed in portable electronic devices such as smartphones. The thickness of portable electronic devices tends to decrease in response to market demand, and accordingly, miniaturization of the camera module may be also required.

In detail, to prevent the height of the camera module from significantly affecting the thickness of the portable electronic device, a camera module having a reflective member for changing a path of light may be proposed.

Since such camera modules change the path of light through the reflective member, there may be an advantage in that the total track length of the camera module (the distance from the lens closest to the object side to the imaging plane) may not affect the thickness of the portable electronic device.

However, in this case, there may be a problem that the total track length of the camera module becomes too large in one direction.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a folded lens system includes a lens module including a plurality of lenses, an image sensor having an imaging plane, and a first reflection module disposed between the lens module and the image sensor and configured to change a path of light passing through the lens module a plurality of times, wherein the light passing through the lens module is subjected to three total internal reflections and two reflections by the first reflection module.

The first reflection module may include a first surface, a second surface, a third surface, a fourth surface, a fifth surface and a sixth surface, the first surface may be disposed closest to the lens module, and the sixth surface may be disposed closest to the image sensor, an angle between the first surface and the second surface, an angle between the second surface and the third surface, and an angle between the fourth surface and the sixth surface may be acute angles, and an angle between the fifth surface and the sixth surface may be an obtuse angle.

The first surface, the second surface, and the fourth surface may be subjected to refraction or total internal reflection according to an incident angle of light.

In the third surface and the fifth surface, light incident on each surface may be reflected.

The second surface and the fourth surface may be disposed to face each other, and an air gap may be present between the second surface and the fourth surface.

The light passing through the lens module may be refracted while passing through the first surface and may be incident on the second surface, and an incident angle of the light incident on the second surface may be greater than a critical angle, the light totally reflected from the second surface may be incident on the third surface, and an incident angle of the light incident on the third surface may be less than a critical angle, the light reflected from the third surface may be incident on the first surface, and an incident angle of the light incident on the first surface may be greater than a critical angle, the light totally reflected from the first surface may pass through the second surface and the fourth surface, may be refracted and may be incident on the fifth surface, and an incident angle of the light incident on the fifth surface may be less than a critical angle, the light reflected from the fifth surface may be incident on the fourth surface, and an incident angle of the light incident on the fourth surface may be greater than a critical angle, and the light totally reflected from the fourth surface may pass through the sixth surface, may be refracted, and may be incident on the image sensor.

The first reflection module may include a first prism and a second prism spaced apart from each other, each of the first prism and the second prism may have a polygonal shape, and the first prism may have two total internal reflection surfaces and one reflection surface, and the second prism may have one total internal reflection surface and one reflection surface.

The folded lens system may further include a second reflection module disposed in front of the lens module.

The folded lens system may further include a second reflection module disposed between the lens module and the first reflection module.

The first reflection module may include a first surface, a second surface, a third surface, a fourth surface, a fifth surface and a sixth surface, the first surface may be disposed closest to the lens module, and the fifth surface may be disposed closest to the image sensor, an angle between the first surface and the second surface, an angle between the fourth surface and the fifth surface, and an angle between the fourth surface and the sixth surface may be acute angles, an angle between the first surface and the third surface may be an obtuse angle, and the second surface and the fourth surface may be disposed to face each other, and an air gap may be present between the second surface and the fourth surface.

The light passing through the lens module may be refracted while passing through the first surface and may be incident on the second surface, and an incident angle of the light incident on the second surface may be greater than a critical angle, the light totally reflected from the second surface may be incident on the third surface, and an incident angle of the light incident on the third surface may be less than a critical angle, the light reflected from the third surface may pass through the second surface and the fourth surface, may be refracted, and may be incident on the fifth surface, and an incident angle of the light incident on the fifth surface may be greater than a critical angle, the light totally reflected from the fifth surface may be incident on the sixth surface, and an incident angle of the light incident on the sixth surface may be less than a critical angle, the light reflected from the sixth surface may be incident on the fourth surface, and an incident angle of the light incident on the fourth surface may be greater than a critical angle, and the light totally reflected from the fourth surface may pass through the fifth surface, may be refracted and may be incident on the image sensor.

The lens module may satisfy IMG HT/FBL<0.7, where IMG HT is a diagonal length of the imaging plane, and FBL is a distance from an apex of an image-side surface of a lens closest to the image sensor to the imaging plane.

The lens module may satisfy TTL/f<0.75, where TTL is a distance from an apex of an object-side surface of a lens farthest from the image sensor to the imaging plane, and f is a total focal length of the lens module.

A lens disposed farthest from the image sensor may have positive refractive power.

The lens module may satisfy $0<f1/f<0.5$, where f1 is a focal length of the lens disposed farthest from the image sensor, and f is a total focal length of the lens module.

A lens disposed second farthest from the image sensor may have negative refractive power.

The lens module may satisfy $-0.7<f2/f<0$, where f2 is a focal length of the lens second farthest from the image sensor.

TTL/(TL+OPL)<0.75 may be satisfied, where TTL is a distance from an apex of an object-side surface of a lens disposed farthest from the image sensor to the imaging plane, TL is a distance from the vertex of the object-side surface of the lens farthest from the image sensor to an apex of an image-side surface of a lens disposed closest to the image sensor, and OPL is an optical path length from the image-side surface of the lens disposed closest to the image sensor to the imaging plane.

In another general aspect, a folded lens system includes a lens module comprising a plurality of lenses, an image sensor having an imaging plane, and a first prism spaced apart from a second prism by an air gap, wherein two adjacent surfaces that refract and reflect light, respectively, between the lens module and the imaging plane of one of the first or second prisms form an obtuse angle.

Light passing through the first or second prism including the two surfaces forming the obtuse angle may be subjected to one total internal reflection and one reflection, and light passing through the other of the first or second prism may be subjected to two total internal reflections and one reflection.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
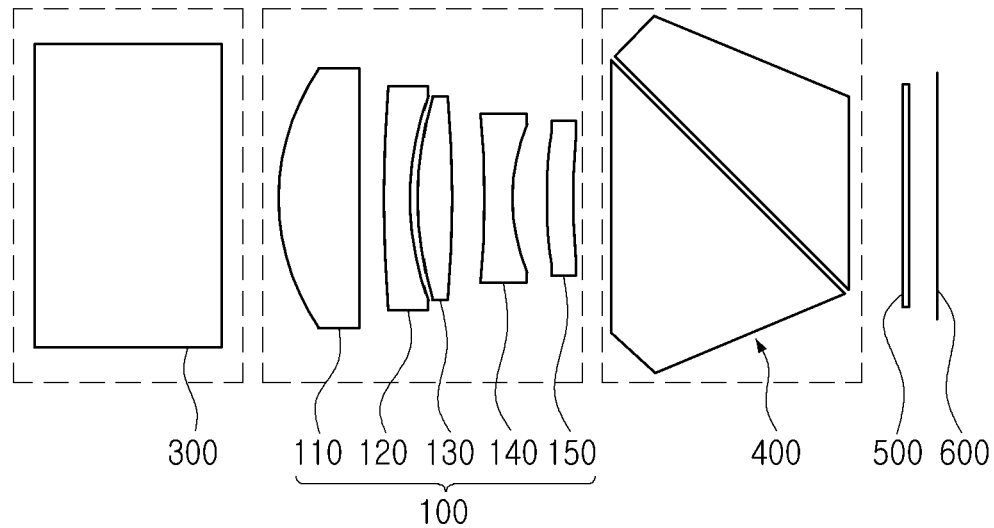
FIG. 1 is a schematic configuration diagram of a folded lens system according to an example.

Hereinafter, while example embodiments of the present disclosure will be described in detail with reference to the accompanying drawings as follows, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Herein, it is noted that use of the term "may" with respect to an example or embodiment, e.g., as to what an example or embodiment may include or implement, means that at least one example or embodiment exists in which such a feature is included or implemented while all examples and examples are not limited thereto.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Spatially relative terms, such as "above," "upper," "below," "lower," and the like, may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

In the following lens configuration diagrams, the thicknesses, sizes, and shapes of the lenses are illustrated somewhat exaggerated for explanation, and in detail, the shapes of the spherical or aspherical surfaces presented in the lens configuration diagrams are only presented as examples and are not limited thereto.

The folded lens system according to an example may be mounted on a portable electronic device. For example, the folded lens system may be a component of a camera module mounted on a portable electronic device. The portable electronic device may be a portable electronic device such as a mobile communication terminal, a smartphone, or a tablet PC.

In the examples described herein, the first lens (or the frontmost lens) refers to the lens closest to the object side, and the last lens (or rearmost lens) refers to the lens closest to the imaging plane (or image sensor).

In addition, in each lens, the first surface refers to a surface close to the object side (or the object-side surface), and the second surface refers to a surface close to the image side (or the image surface). In addition, in the present specification, the numerical values for the radius of curvature, thickness, distance, focal length, and the like of the lens are all in mm units, and the unit of field of view (FOV) is degree.

In addition, in the description of the shape of each lens, the convex shape of one surface means that the paraxial region portion of the corresponding surface is convex, and the concave shape of one surface means that the paraxial region of the corresponding surface is concave.

On the other hand, the paraxial region means a relatively very narrow region near the optical axis and including the optical axis.

The imaging plane may mean a virtual plane on which a focus is formed by the lens system. Alternatively, the imaging plane may mean one surface of the image sensor on which light is received.

One or more examples as described herein provide a folded lens system that may be miniaturized.

Figure 2:
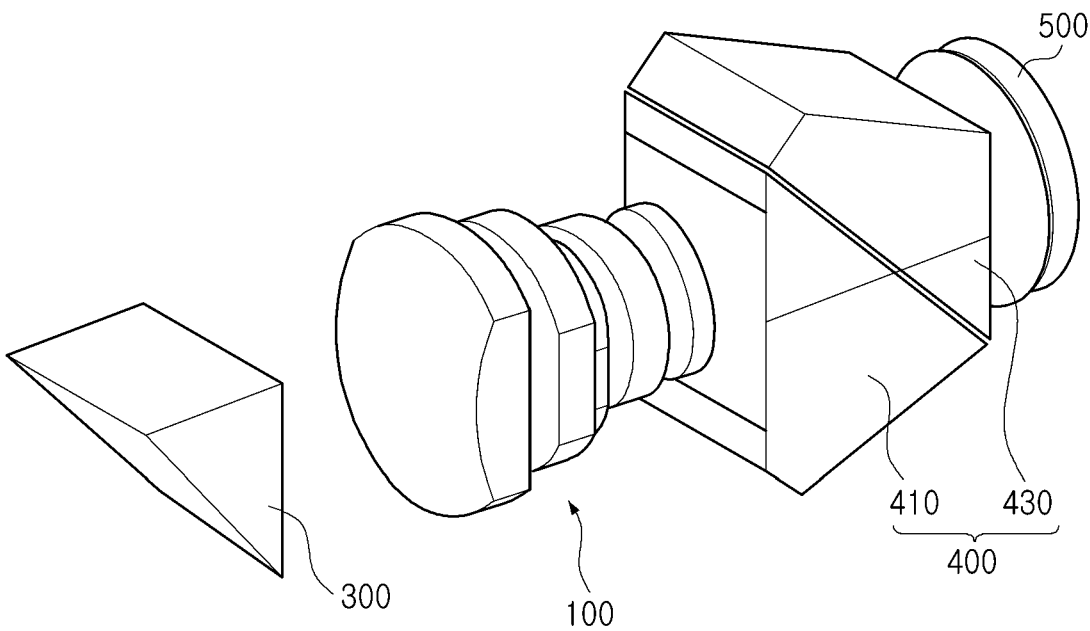
FIG. 2 is a schematic perspective view of a folded lens system according to an example.

FIG. 1 is a schematic configuration diagram of a folded lens system according to an example, and FIG. 2 is a schematic perspective view of a folded lens system according to an example.

Referring to FIGS. 1 and 2, a folded lens system according to an example includes a first reflection module 300, a lens module 100, a second reflection module 400 and an image sensor 600.

In addition, the folded lens system may further include an infrared cut filter 500 for blocking infrared rays. The infrared cut filter 500 may be disposed between the second reflection module 400 and the image sensor 600.

The first reflection module 300 has a reflective surface for changing a path of light. For example, the first reflection module 300 may be a mirror or a prism. The first reflection module 300 is disposed in front of the lens module 100, and may change the path of the light such that the light incident on the first reflection module 300 is directed toward the lens module 100.

The second reflection module 400 is disposed behind the lens module 100 (e.g., between the lens module 100 and the image sensor 600), and may change the path of the light passing through the lens module 100 a plurality of times.

The second reflection module 400 has a plurality of surfaces for changing the path of light. As an example, the light passing through the lens module 100 may be subjected to three total internal reflections and two reflections by the second reflection module 400.

For example, by changing the path of light several times by the second reflection module 400, a relatively long path of light may be formed in a relatively narrow space.

Therefore, a long focal length may be provided while miniaturizing the folded lens system.

The second reflection module 400 includes a first prism 410 and a second prism 430 spaced apart from each other, and each of the first prism 410 and the second prism 430 may have a polygonal shape.

The first prism 410 and the second prism 430 are disposed to face each other at an interval. Accordingly, an air gap is present between the surfaces of the first prism 410 and the second prism 430 facing each other.

The lens module 100 includes a plurality of lenses. For example, the lens module 100 may include four or more lenses. For example, the lens module 100 may include five lenses.

Referring to FIGS. 1 and 2, the lens module 100 may include a first lens 110, a second lens 120, a third lens 130, a fourth lens 140, and a fifth lens 150 sequentially disposed from the object side. In addition, a stop may be disposed between the fourth lens 140 and the fifth lens 150.

In this case, the first lens 110 has positive refractive power, and the second lens 120 has negative refractive power.

In an example, the lens characteristics (Radius of curvature, thickness of lenses or distance between lenses, refractive index, Abbe number, focal length) of each lens of the lens module 100 are illustrated in Table 1.

In the case of an example illustrated in FIGS. 1 and 2, the lens module 100 is disposed between the first reflection module 300 and the second reflection module 400. For example, the first reflection module 300 is disposed in front of the lens module 100, and the second reflection module 400 is disposed behind the lens module 100.

Figure 3:
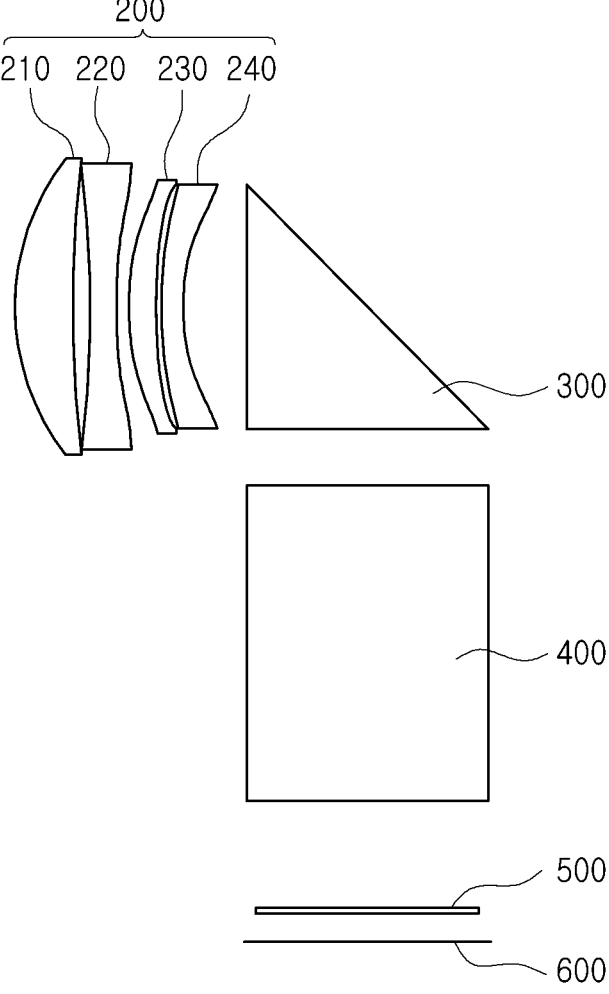
FIG. 3 is a schematic configuration diagram of a folded lens system according to another example.
Figure 4:
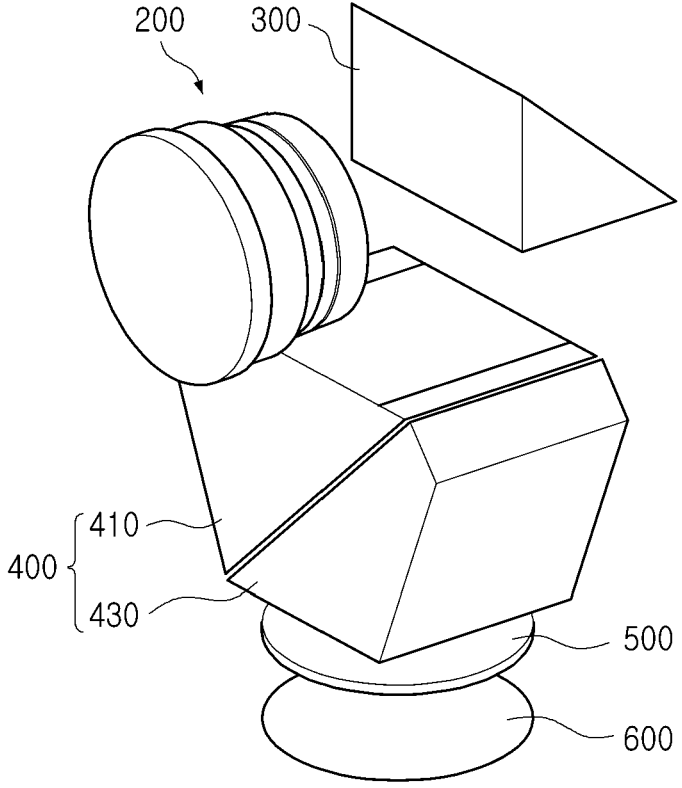
FIG. 4 is a schematic perspective view of a folded lens system according to another example.

However, the position of the lens module 100 is not limited thereto, and as in the example illustrated in FIGS. 3 and 4, the first reflection module 300 and the second reflection module 400 may also be located on the rear of the lens module 100. Table 1 relates to a form in which the first reflection module 300 and the second reflection module 400 are disposed at the rear of the lens module 100.

In Table 1, the * mark on the surface number means that the corresponding surface is an aspherical surface.

TABLE 1

| Surface Number | Remark | Radius of curvature | Thickness or distance | Refractive index | Abbe number | Focal length |
|---|---|---|---|---|---|---|
| 1* | First lens | 7.1309 | 1.787 | 1.5349 | 55.7 | 12.6648 |
| 2* | | −134.8793 | 1.000 | | | |
| 3 | Second lens | 36.1134 | 0.700 | 1.6392 | 23.5 | −19.1519 |
| 4 | | 9.1403 | 0.300 | | | |
| 5 | Third lens | 8.1143 | 1.161 | 1.6608 | 20.4 | 11.5936 |
| 6 | | −161.9693 | 1.100 | | | |
| 7* | Fourth lens | −11.0678 | 0.800 | 1.6392 | 23.5 | −5.9221 |
| 8*(stop) | | 6.0059 | 0.285 | | | |
| 9* | Fifth lens | 19.2464 | 1.000 | 1.5440 | 56.0 | 24.6716 |
| 10* | | −44.1533 | 0.500 | | | |
| 11 | First prism | Infinity | 3.898 | 1.7174 | 29.5 | |
| 12 | | Infinity | 3.898 | 1.7174 | 29.5 | |
| 13 | | Infinity | 5.513 | 1.7174 | 29.5 | |
| 14 | | Infinity | 2.756 | 1.7174 | 29.5 | |
| 15 | | Infinity | 0.100 | | | |
| 16 | Second prism | Infinity | 2.756 | 1.7174 | 29.5 | |
| 17 | | Infinity | 3.898 | 1.7174 | 29.5 | |
| 18 | | Infinity | 2.756 | 1.7174 | 29.5 | |
| 19 | | Infinity | 0.7 | | | |
| 20 | Filter | Infinity | 0.22 | 1.5168 | 64.2 | |
| 21 | | Infinity | 0.454 | | | |
| 22 | Imaging plane | Infinity | | | | |

The total focal length f of the lens module 100 according to an example is 30.6 mm, the distance (TTL) from the apex of the object-side surface of the first lens 110 to the imaging plane is 16.5 mm, the distance (FBL) from the apex of the image-side surface of the fifth lens 150 to the imaging plane is 8.37 mm, the diagonal length (IMG HT) of the imaging plane is 5.57 mm, and Fno (F-number) is 4.4.

At least one of the first lens 110 to the fifth lens 150 may be an aspherical lens. For example, the object-side surface and the image-side surface of the first lens 110, the fourth lens 140, and the fifth lens 150 are all aspherical surfaces.

The aspherical surface of each lens is expressed by Equation 1.

$$Z = \frac{cY^2}{1 + \sqrt{1 - (1 + K)c^2 Y^2}} + AY^4 +$$ [Equation 1]

-continued
$$BY^6 + CY^8 + DY^{10} + EY^{12} + FY^{14} + GY^{16} + HY^{18}$$

In Equation 1, c is the curvature of the lens (the reciprocal of the radius of curvature), K is the conic constant, and Y represents the distance from any point on the aspherical surface of the lens to the optical axis. In addition, constants A to G and H mean aspheric coefficients. In addition, Z(SAG) represents the distance between any point on the aspherical surface of the lens and the apex of the corresponding aspherical surface in the optical axis direction.

The object-side and image-side surfaces of the first lens 110, the fourth lens 140, and the fifth lens 150 have aspheric coefficients as illustrated in Table 2.

TABLE 2

| Surface Number | 1 | 2 | 7 | 8 | 9 | 10 |
|---|---|---|---|---|---|---|
| Conic constant(K) | 7.1309E+00 | −9.0000E+01 | 9.1158E+00 | 2.4552E+00 | 5.9018E+01 | −4.4153E+01 |
| 4th order coefficient (A) | −4.9362E−01 | −1.6709E−04 | −2.7043E−03 | −4.7337E−03 | 1.6031E−03 | −9.0000E+01 |
| 6th order coefficient (B) | 1.1891E−04 | −2.3448E−05 | 3.8128E−04 | −2.8092E−04 | −8.2411E−04 | 1.5605E−03 |
| 8th order coefficient (C) | −1.7017E−05 | −5.6369E−07 | 7.9979E−05 | 1.1412E−05 | −3.2407E−05 | 2.7941E−04 |
| 10th order coefficient (D) | −4.9315E−07 | 8.1767E−08 | −9.9135E−06 | 3.9873E−05 | 2.6456E−05 | −7.3063E−05 |
| 12th order coefficient (E) | 1.5571E−08 | 3.6361E−09 | 2.3333E−07 | −3.9568E−06 | −3.2015E−06 | −6.6544E−06 |
| 14th order coefficient (F) | 2.7853E−10 | −6.9569E−10 | 0.0000E+00 | 0.0000E+00 | 4.1698E−08 | 1.1291E−06 |
| 16th order coefficient (G) | −3.3011E−11 | 1.2786E−11 | 0.0000E+00 | 0.0000E+00 | 9.7504E−09 | −1.6256E−07 |
| 18th order coefficient (H) | −8.7682E−12 | 0.0000E+00 | 0.0000E+00 | 0.0000E+00 | 0.0000E+00 | 2.2781E−08 |

In another example, the lens characteristics (Radius of curvature, thickness of lenses or distance between lenses, refractive index, Abbe number, focal length) of each lens of the lens module 100 are illustrated in Table 3.

TABLE 3

| Surface Number | Remark | Radius of curvature | Thickness or distance | Refractive index | Abbe number | Focal length |
|---|---|---|---|---|---|---|
| 1* | First lens | 7.3015 | 1.687 | 1.5349 | 55.7 | 13.3652 |
| 2* | | −393.4619 | 1.005 | | | |
| 3* | Second lens | 41.8557 | 0.500 | 1.6392 | 23.5 | −20.0519 |
| 4* | | 9.8405 | 0.300 | | | |
| 5* | Third lens | 8.5057 | 1.200 | 1.6608 | 20.4 | 11.4277 |
| 6* | | −70.5921 | 1.215 | | | |
| 7 | Fourth lens | −10.7425 | 0.801 | 1.6392 | 23.5 | −5.8036 |
| 8*(stop) | | 5.9211 | 0.294 | | | |
| 9* | Fifth lens | 21.3001 | 0.928 | 1.5440 | 56.0 | 20.8002 |
| 10* | | −23.9851 | 1.200 | | | |
| 11 | First prism | infinity | 2.756 | 1.7174 | 29.5 | |
| 12 | | infinity | 3.898 | 1.7174 | 29.5 | |
| 13 | | infinity | 2.756 | 1.7174 | 29.5 | |
| 14 | | infinity | 0.100 | | | |
| 15 | Second prism | infinity | 2.756 | 1.7174 | 29.5 | |
| 16 | | infinity | 5.513 | 1.7174 | 29.5 | |
| 17 | | infinity | 3.898 | 1.7174 | 29.5 | |
| 18 | | infinity | 3.898 | 1.7174 | 29.5 | |
| 19 | | infinity | 0.5 | | | |
| 20 | Filter | infinity | 0.22 | 1.5168 | 64.2 | |
| 21 | | infinity | 0.506 | | | |
| 22 | Imaging plane | infinity | | | | |

The total focal length f of the lens module 100 according to another example is 30.6 mm, the distance (TTL) from the apex of the object-side surface of the first lens 110 to the imaging plane is 17.08 mm, the distance (FBL) from the apex of the image side of the fifth lens 150 to the imaging plane is 9.15 mm, the diagonal length (IMG HT) of the imaging plane is 5.57 mm, and Fno (F-number) is 4.4.

At least one of the first lens 110 to the fifth lens 150 may be an aspherical lens. For example, the object-side surfaces and the image-side surfaces of the first lens 110 to the fifth lens 150 are all aspherical as illustrated in Table 4.

TABLE 4

| | Surface Number | | | | |
|---|---|---|---|---|---|
| | 1 | 2 | 3 | 4 | 5 |
| Conic constant(K) | −5.4878E−01 | −9.0000E+01 | 0.0000E+00 | 0.0000E+00 | 0.0000E+00 |
| 4th order coefficient (A) | 8.4247E−05 | −1.8073E−04 | −7.0520E−06 | 7.4089E−06 | −2.5307E−06 |
| 6th order coefficient (B) | −1.1888E−05 | −2.4747E−05 | −5.5410E−07 | 1.0296E−06 | −9.8279E−07 |
| 8th order coefficient (C) | −6.7029E−07 | −4.1913E−07 | −3.1773E−08 | 5.1428E−08 | −2.0475E−09 |
| 10th order coefficient (D) | 5.0172E−09 | 8.0892E−08 | −1.3567E−09 | 1.7697E−09 | 7.8844E−09 |
| 12th order coefficient (E) | 4.0236E−10 | 3.0750E−09 | −2.1706E−10 | 1.1791E−09 | −3.4100E−10 |
| 14th order coefficient (F) | 1.2333E−11 | −7.0389E−10 | 7.1786E−12 | 1.5771E−10 | −7.8015E−11 |
| 16th order coefficient (G) | −6.3943E−12 | 1.8886E−11 | 0.0000E+00 | 0.0000E+00 | 0.0000E+00 |

TABLE 4-continued

| | Surface Number | | | | |
| --- | --- | --- | --- | --- | --- |
| | 6 | 7 | 8 | 9 | 10 |
| Conic constant(K) | 0.0000E+00 | 8.4667E+00 | 2.5724E+00 | 7.5958E+01 | −9.0000E+01 |
| 4th order coefficient (A) | 1.0539E−06 | −2.5513E−03 | −4.6557E−03 | 2.1907E−03 | 1.4565E−03 |
| 6th order coefficient (B) | 1.1985E−06 | 3.9118E−04 | −2.5232E−04 | −7.4545E−04 | 9.8662E−05 |
| 8th order coefficient (C) | 8.8040E−09 | 7.8533E−05 | 3.1219E−05 | −5.3803E−05 | −5.2227E−05 |
| 10th order coefficient (D) | −7.2924E−09 | −9.4930E−06 | 3.7953E−05 | 2.6611E−05 | −4.8275E−06 |
| 12th order coefficient (E) | −6.8984E−10 | 1.8284E−07 | −4.5165E−06 | −2.6356E−06 | 7.5540E−07 |
| 14th order coefficient (F) | −5.9647E−10 | 0.0000E+00 | 0.0000E+00 | 6.4315E−08 | −2.5555E−07 |
| 16th order coefficient (G) | 0.0000E+00 | 0.0000E+00 | 0.0000E+00 | −3.4756E−08 | 2.8842E−08 |

In examples, the first lens 210 has positive refractive power, and the object-side surface and the image-side surface of the first lens 110 are convex. The absolute value of the radius of curvature of the object-side surface of the first lens 110 may be less than the absolute value of the radius of curvature of the image-side surface of the first lens 110. For example, when the radius of curvature of the object-side surface of the first lens 110 is R1 and the radius of curvature of the image-side surface of the first lens 110 is R2, |R2|/|R1|>15 may be satisfied.

The second lens 120 has negative refractive power, an object-side surface of the second lens 120 is convex, and an image-side surface of the second lens 120 has a concave shape. The absolute value of the radius of curvature of the object-side surface of the second lens 120 may be greater than the absolute value of the radius of curvature of the image-side surface of the second lens 120. For example, when the radius of curvature of the object-side surface of the second lens 120 is R3 and the radius of curvature of the image-side surface of the second lens 120 is R4, |R3|/|R4|>3 may be satisfied.

The third lens 130 has positive refractive power, and the object-side surface and the image-side surface of the third lens 130 each have a convex shape. The absolute value of the radius of curvature of the object-side surface of the third lens 130 may be less than the absolute value of the radius of curvature of the image-side surface of the third lens 130. For example, when the radius of curvature of the object-side surface of the third lens 130 is R5 and the radius of curvature of the image-side surface of the third lens 130 is R6, |R6|/|R5|>6 may be satisfied.

The fourth lens 140 has negative refractive power, and the object-side surface and the image-side surface of the fourth lens 140 each have a concave shape. The absolute value of the radius of curvature of the object-side surface of the fourth lens 140 may be greater than the absolute value of the radius of curvature of the image-side surface of the fourth lens 140. For example, when the radius of curvature of the object-side surface of the fourth lens 140 is R7 and the radius of curvature of the image-side surface of the fourth lens 140 is R8, |R7|/|R8|>1 may be satisfied.

The fifth lens 150 has positive refractive power, and the object-side surface and the image-side surface of the fifth lens 150 each have a convex shape.

The fifth lens 150 may be a lens having the weakest refractive power among the plurality of lenses. For example, among the first lens 110 to the fifth lens 150, the absolute value of the focal length of the fifth lens 150 may be the greatest.

The lens module 100 according to examples may satisfy at least one of the following conditional expressions.

$$\text{IMG HT/FBL} < 0.7 \qquad \text{[Condition 1]}$$

$$0 < f1/f < 0.5 \qquad \text{[Condition 2]}$$

$$-0.7 < f2/f < 0 \qquad \text{[Condition 3]}$$

$$\text{TTL}/f < 0.75 \qquad \text{[Condition 4]}$$

$$\text{TTL}/f < 0.59 \qquad \text{[Conditional 5]}$$

IMG HT is the diagonal length of the imaging plane, FBL is the distance from the apex of the image-side surface of the fifth lens 150 to the imaging plane, TTL is the distance from the apex of the object-side surface of the first lens 110 to the imaging plane, f is the total focal length of the lens module 100, f1 is the focal length of the first lens 110, and f2 is the focal length of the second lens.

FIG. 3 is a schematic configuration diagram of a folded lens system according to another example, and FIG. 4 is a schematic perspective view of a folded lens system according to another example.

Referring to FIGS. 3 and 4, the folded lens system according to another example includes a lens module 200, a first reflection module 300, a second reflection module 400 and an image sensor 600.

In addition, the folded lens system may further include an infrared cut filter 500 for blocking infrared rays. The infrared cut filter 500 may be disposed between the second reflection module 400 and the image sensor 600.

The first reflection module 300 and the second reflection module 400 may be disposed between the lens module 200 and the image sensor 600. The first reflection module 300 may be disposed relatively closer to the lens module 200, and the second reflection module 400 may be disposed relatively closer to the image sensor 600.

The lens module 200 includes a plurality of lenses. For example, the lens module 200 may include four or more lenses.

Referring to FIGS. 3 and 4, the lens module 200 may include a first lens 210, a second lens 220, a third lens 230, and a fourth lens 240 disposed in order from the object side.

The first lens 210 has positive refractive power, an object-side surface of the first lens 210 is convex, and an image-side surface of the first lens 210 has a concave shape. The absolute value of the radius of curvature of the object-side surface of the first lens 210 is less than the absolute value of the radius of curvature of the image-side surface of the first lens 210.

The second lens 220 has negative refractive power, and an object-side surface and an image-side surface of the second lens 220 each have a concave shape. The absolute value of the radius of curvature of the object-side surface of the second lens 220 is greater than the absolute value of the radius of curvature of the image-side surface of the second lens 220.

The third lens 230 has positive refractive power, the object-side surface of the third lens 230 is convex, and the image-side surface of the third lens 230 has a concave shape.

The fourth lens 240 has positive or negative refractive power, the object-side surface of the fourth lens 240 is convex, and the image-side surface of the fourth lens 240 has a concave shape.

The fourth lens 240 may be a lens having the weakest refractive power among the plurality of lenses. For example, among the first lenses 210 to the fourth lenses 240, the absolute value of the focal length of the fourth lens 240 may be the greatest.

The first reflection module 300 has a reflective surface for changing a path of light. For example, the first reflection module 300 may be a mirror or a prism. The first reflection module 300 is disposed at the rear of the lens module 200, and may change the path of light such that the light passing through the lens module 200 is directed toward the second reflection module 400.

The second reflection module 400 is disposed between the first reflection module 300 and the image sensor 600, and may change the path of light incident on the second reflection module 400 a plurality of times.

The second reflection module 400 has a plurality of surfaces for changing the path of light. As an example, the light incident on the second reflection module 400 may undergo three total internal reflections and two reflections by the second reflection module 400.

For example, by changing the path of light several times by the second reflection module 400, a long path of light may be formed in a relatively narrow space.

Therefore, a long focal length may be provided while miniaturizing the folded lens system.

The second reflection module 400 includes a first prism 410 and a second prism 430 spaced apart from each other, and each of the first prism 410 and the second prism 430 may have a polygonal shape.

In addition, the first prism 410 and the second prism 430 are disposed to face each other at an interval. Accordingly, an air gap is present between the surfaces of the first prism 410 and the second prism 430 facing each other.

Referring back to FIGS. 1 to 4, the folded lens system according to an example may satisfy the condition TTL/(TL+OPL)<0.75.

TTL is the distance from the apex of the object-side surface of the lens (e.g., the first lens 110, 210) disposed farthest from the image sensor 600 to the imaging plane, TL is the distance from the apex of the object-side surface of the lens (e.g., the first lens 110, 210) disposed farthest from the image sensor 600, to the apex of the image-side surface of the lens (e.g., the fifth lens 150 or the fourth lens 240) disposed closest to the image sensor 600, and OPL is an optical path length from the apex of the image-side surface of the lens (e.g., the fifth lens 150 or the fourth lens 240) disposed closest to the image sensor 600 to the imaging plane. The optical path length may be defined as the geometric distance×the refractive index of the medium.

The folded lens system according to an example may satisfy the condition CRA≤15°. CRA (Chief Ray Angle) may mean an angle between the chief ray and the optical axis on the imaging plane.

Figure 5:
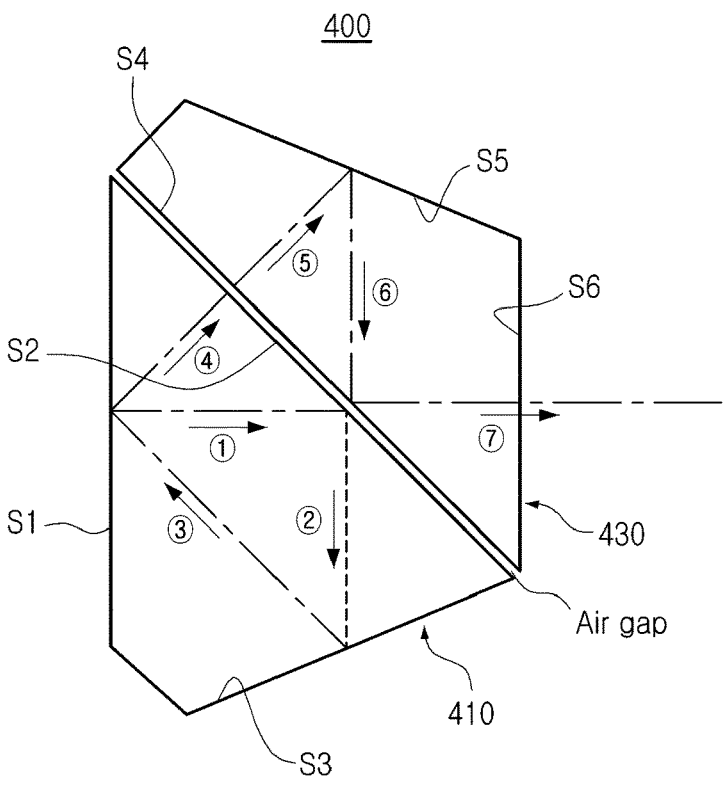
FIG. 5 is a view illustrating an optical path in a second reflection module of a folded lens system according to an example.

FIG. 5 is a view illustrating an optical path in the second reflection module of the folded lens system according to an example.

Referring to FIG. 5, the second reflection module 400 includes a first surface S1, a second surface S2, a third surface S3, a fourth surface S4, a fifth surface S5, and a sixth surface S6. In this case, the first surface S1 is the surface disposed closest to the lens module 100, 200, and the sixth surface S6 is the surface disposed closest to the image sensor 600.

In an example, the second reflection module 400 includes a first prism 410 and a second prism 430 spaced apart from each other, and the first prism 410 and the second prism 430 may each have a polygonal shape. The first surface (S1), the second surface (S2) and the third surface (S3) may refer to the surfaces of the first prism 410, and the fourth surface S4, the fifth surface S5, and the sixth surface S6 may refer to surfaces of the second prism 430.

The first prism 410 may have two total internal reflection surfaces and one reflection surface, and the second prism 430 may have one total internal reflection surface and one reflection surface.

The refractive index of the first prism 410 may be greater than 1.65, and the refractive index of the second prism 430 may be greater than 1.65. For example, the refractive indices of the first prism 410 and the second prism 430 may be 1.7174.

The second surface S2 and the fourth surface S4 are disposed to face each other, and the second surface S2 and the fourth surface S4 are disposed to be spaced apart from each other. Accordingly, an air gap may exist between the second surface S2 and the fourth surface S4.

The angle between the first surface S1 and the second surface S2, the angle between the second surface S2 and the third surface S3, and the angle between the fourth surface S4 and the sixth surface S6 are each an acute angle, and the angle between the fifth surface S5 and the sixth surface S6 may be an obtuse angle.

Also, an angle $\theta 1$ between the optical axis and the second surface S2 may be greater than 35° and less than 55° (or greater than 125° and less than 145°). For example, the angle $\theta 1$ between the optical axis and the second surface S2 may be 45° (or 135°).

In addition, an angle $\theta 2$ between the optical axis and the fourth surface S4 may be greater than 35° and less than 55° (or greater than 125° and less than 145°). For example, the angle $\theta 2$ between the optical axis and the fourth surface S4 may be 45° (or 135°). $\theta 2 - \theta 1$ may be greater than −5° and less than 5°.

Refraction or total internal reflection may be formed on the first surface S1, the second surface S2, and the fourth surface S4 according to the incident angle of the light, and on the third surface S3 and the fifth surface S5, light incident on each surface may be reflected.

According to Snell's law, when light is refracted in two media with different refractive indices, $ni \times sin\ \theta i = nt \times sin\ \theta t$ is established. In this case, there is a case in which the refraction angle $\theta t$ becomes 90°, and the incident angle ($\theta i$) at this time is referred to as the critical angle ($\theta c$).

Using Snell's law, Critical angle $\theta c = sin\ ^-1\ (nt/ni)$, and when light enters with an incident angle greater than the critical angle $\theta c$, the light is not refracted and is fully reflected to the incident side medium, and this is known as Total Internal Reflection.

The path of light in the second reflection module 400 is the same as the paths ① to ⑦ illustrated in FIG. 5.

Referring to FIG. 5, the light that has passed through the lens module 100, 200 is refracted while passing through the first surface S1 and is incident on the second surface S2, and an incident angle of the light incident on the second surface S2 is greater than a critical angle. Accordingly, total internal reflection occurs on the second surface S2.

The light totally reflected from the second surface S2 is incident on the third surface S3, and an incident angle of light incident on the third surface S3 is narrower than a critical angle. Accordingly, reflection occurs on the third surface S3.

The light reflected from the third surface S3 is incident on the first surface S1 again, and the incident angle of the light incident on the first surface S1 is wider than the critical angle. Therefore, when the light reflected from the third surface S3 is incident on the first surface S1, total internal reflection occurs.

The light totally reflected from the first surface S1 passes through the second surface S2 again and is refracted, and passes through the fourth surface S4 spaced apart from the second surface S2 and is refracted and incident on the fifth surface S5. An incident angle of light incident on the fifth surface S5 is narrower than a critical angle. Accordingly, reflection occurs on the fifth surface S5.

The light reflected from the fifth surface S5 is incident on the fourth surface S4 again, and the incident angle of the light incident on the fourth surface S4 is greater than the critical angle. Therefore, when the light reflected from the fifth surface S5 is incident on the fourth surface S4, total internal reflection occurs.

The light totally reflected by the fourth surface S4 passes through the sixth surface S6, is refracted, and is incident on the image sensor 600.

The path of light in the second reflection module 400 is summarized in Table 5 below.

a fourth surface S4', a fifth surface S5', and a sixth surface S6'. In this case, the first surface S1' is the surface disposed closest to the lens module 100, 200, and the fifth surface S5' is the surface disposed closest to the image sensor 600.

In an example, the second reflection module 400' includes a first prism 410' and a second prism 430' spaced apart from each other, and the first prism 410' and the second prism 430' may each have a polygonal shape. The first surface S1', the second surface S2' and the third surface S3' may refer to the surfaces of the first prism 410', and the fourth surface S4', the fifth surface S5' and the sixth surface S6' may refer to surfaces of the second prism 430'.

The first prism 410' may have one total internal reflection surface and one reflection surface, and the second prism 430' may have two total internal reflection surfaces and one reflection surface.

The second surface S2' and the fourth surface S4' are disposed to face each other, and the second surface S2' and the fourth surface S4' are disposed to be spaced apart from each other. Accordingly, an air gap may exist between the second surface S2' and the fourth surface S4'.

The angle between the first surface S1' and the second surface S2', the angle between the fourth surface S4' and the fifth surface S5', and the angle between the fourth surface S4' and the sixth surface S6' are respectively acute angles, and the angle between the first surface S1' and the third surface S3' may be an obtuse angle.

In the second surface S2', the fourth surface S4', and the fifth surface S5', refraction or total internal reflection may be formed depending on the incident angle of the light, and in the second surface S2' and the sixth surface S6', light incident on each surface may be reflected.

Figure 6:
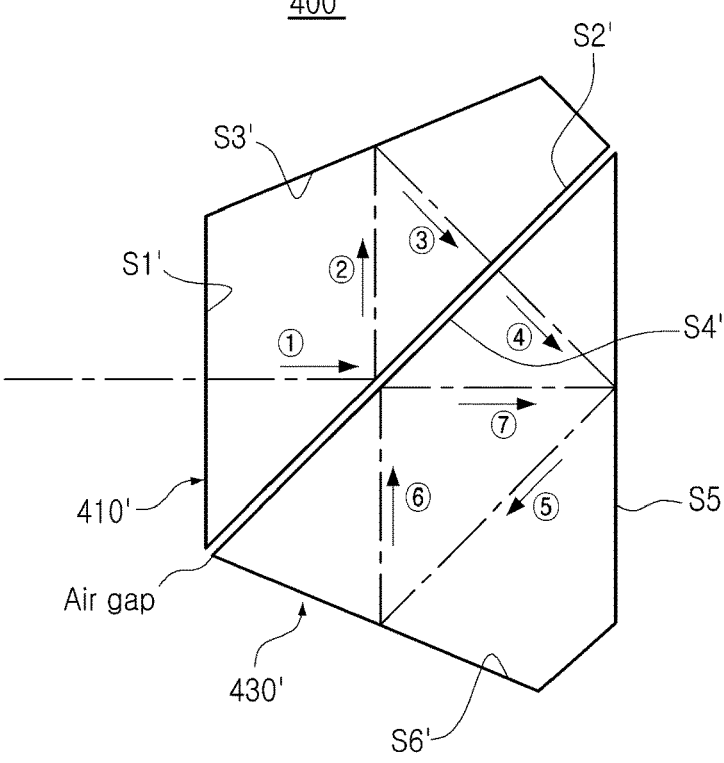
FIG. 6 is a view illustrating an optical path in a second reflection module of a folded lens system according to another example.

The path of light in the second reflection module 400' is the same as the paths ① to ⑦ illustrated in FIG. 6.

Referring to FIG. 6, the light passing through the lens modules 100 and 200 is refracted while passing through the first surface S1', and is incident on the second surface S2', and an incident angle of light incident on the second surface S2' is greater than a critical angle. Accordingly, total internal reflection occurs on the second surface S2'.

The light totally reflected from the second surface S2' is incident on the third surface S3', and an incident angle of light incident on the third surface S3' is narrower than a critical angle. Accordingly, reflection occurs on the third surface S3'.

The light reflected from the third surface S3' passes through the second surface S2' again and is refracted, and passes through the fourth surface S4' spaced apart from the second surface S2' and is refracted to be incident on the fifth surface S5'. An incident angle of light incident on the fifth surface S5' is greater than a critical angle. Accordingly, total internal reflection occurs on the fifth surface S5'.

TABLE 5

| S1 | S2 | S3 | S1 | S2 | S4 | S5 | S4 | S6 |
|---|---|---|---|---|---|---|---|---|
| Refraction | Total internal reflection | Reflection | Total internal reflection | Refraction | Refraction | Reflection | Total internal reflection | Refraction |

FIG. 6 is a view illustrating an optical path in a second reflection module of a folded lens system according to another example.

Referring to FIG. 6, a second reflection module 400' has a first surface S1', a second surface S2', a third surface S3', The light totally reflected from the fifth surface S5' is incident on the sixth surface S6', and an incident angle of the light incident on the sixth surface S6' is narrower than a critical angle. Accordingly, reflection occurs on the sixth surface S6'.

The light reflected from the sixth surface S6' is incident on the fourth surface S4' again, and the incident angle of the light incident on the fourth surface S4' is wider than the critical angle. Therefore, when the light reflected from the sixth surface S6' is incident on the fourth surface S4', total internal reflection occurs.

The light totally reflected from the fourth surface S4' passes through the fifth surface S5', is refracted, and is incident on the image sensor 600.

The path of light in the second reflection module 400' is summarized in Table 6 below.

TABLE 6

| S1' | S2' | S3' | S2' | S4' | S5' | S6' | S4' | S5' |
|---|---|---|---|---|---|---|---|---|
| Refraction | Total internal reflection | Reflection | Refraction | Refraction | Total internal reflection | Reflection | Total internal reflection | Refraction |

As set forth above, in the case of the folded lens system according to an example, the size of the lens system may be reduced.

While specific examples have been illustrated and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A folded lens system comprising:
a lens module comprising a plurality of lenses;
an image sensor having an imaging plane; and
a first reflection module disposed between the lens module and the image sensor and configured to change a path of light passing through the lens module a plurality of times,
wherein the light passing through the lens module is subjected to three total internal reflections and two reflections by the first reflection module,
wherein the first reflection module comprises a first surface, a second surface, a third surface, a fourth surface, a fifth surface and a sixth surface,
wherein the first surface is disposed closest to the lens module, and the sixth surface is disposed closest to the image sensor,
wherein an angle between the first surface and the second surface, an angle between the second surface and the third surface, and an angle between the fourth surface and the sixth surface are acute angles,
wherein an angle between the fifth surface and the sixth surface is an obtuse angle,
wherein the light passing through the lens module is refracted while passing through the first surface and is incident on the second surface, and an incident angle of the light incident on the second surface is greater than a critical angle,
wherein the light totally reflected from the second surface is incident on the third surface, and an incident angle of the light incident on the third surface is less than a critical angle,
wherein the light reflected from the third surface is incident on the first surface, and an incident angle of the light incident on the first surface is greater than a critical angle,
wherein the light totally reflected from the first surface passes through the second surface and the fourth surface, is refracted and is incident on the fifth surface, and an incident angle of the light incident on the fifth surface is less than a critical angle,
wherein the light reflected from the fifth surface is incident on the fourth surface, and an incident angle of the light incident on the fourth surface is greater than a critical angle, and
wherein the light totally reflected from the fourth surface passes through the sixth surface, is refracted, and is incident on the image sensor.

2. The folded lens system of claim 1, wherein the first surface, the second surface, and the fourth surface are subjected to refraction or total internal reflection according to an incident angle of light.

3. The folded lens system of claim 2, wherein in the third surface and the fifth surface, light incident on each surface is reflected.

4. The folded lens system of claim 1, wherein the second surface and the fourth surface are disposed to face each other, and an air gap is present between the second surface and the fourth surface.

5. The folded lens system of claim 1, wherein the first reflection module includes a first prism and a second prism spaced apart from each other,
wherein each of the first prism and the second prism has a polygonal shape, and
wherein the first prism has two total internal reflection surfaces and one reflection surface, and the second prism has one total internal reflection surface and one reflection surface.

6. The folded lens system of claim 1, further comprising a second reflection module disposed in front of the lens module.

7. The folded lens system of claim 1, further comprising a second reflection module disposed between the lens module and the first reflection module.

8. The folded lens system of claim 1, wherein the lens module satisfies IMG HT/FBL<0.7, where IMG HT is a diagonal length of the imaging plane, and FBL is a distance from an apex of an image-side surface of a lens closest to the image sensor to the imaging plane.

9. The folded lens system of claim 1, wherein the lens module satisfies TTL/f<0.75, where TTL is a distance from an apex of an object-side surface of a lens farthest from the image sensor to the imaging plane, and f is a total focal length of the lens module.

10. The folded lens system of claim 1, wherein a lens disposed farthest from the image sensor has positive refractive power.

11. The folded lens system of claim 10, wherein the lens module satisfies 0<f1/f<0.5, where f1 is a focal length of the lens disposed farthest from the image sensor, and f is a total focal length of the lens module.

12. The folded lens system of claim 11, wherein a lens disposed second farthest from the image sensor has negative refractive power.

13. The folded lens system of claim 12, wherein the lens module satisfies −0.7<f2/f<0, where f2 is a focal length of the lens second farthest from the image sensor.

14. The folded lens system of claim 1, wherein TTL/(TL+OPL)<0.75 is satisfied, where TTL is a distance from an apex of an object-side surface of a lens disposed farthest from the image sensor to the imaging plane, TL is a distance from the vertex of the object-side surface of the lens farthest from the image sensor to an apex of an image-side surface of a lens disposed closest to the image sensor, and OPL is an optical path length from the image-side surface of the lens disposed closest to the image sensor to the imaging plane.

\*    \*    \*    \*    \*